July 13, 1943.    H. GSELL    2,324,207
ADJUSTABLE SEAT FOR VEHICLES
Filed July 21, 1941
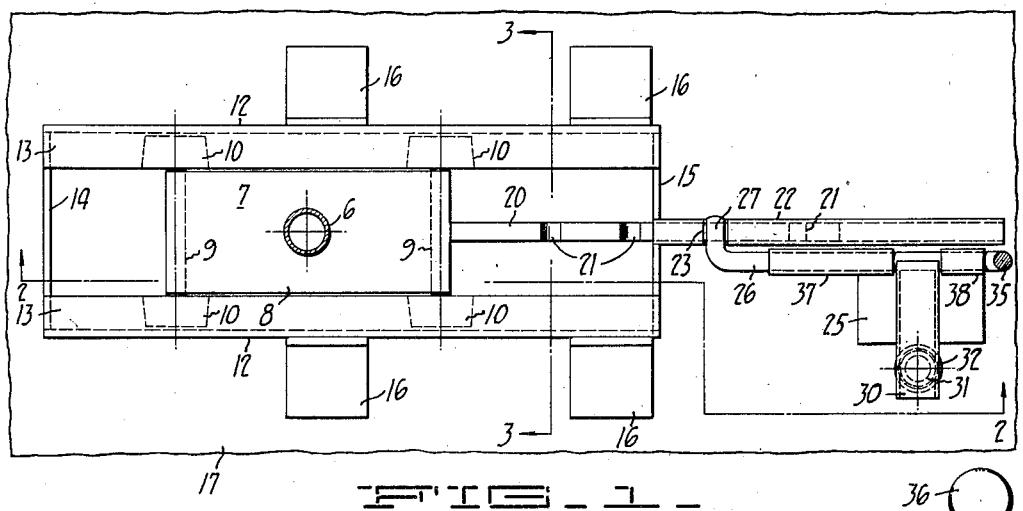
FIG_1_
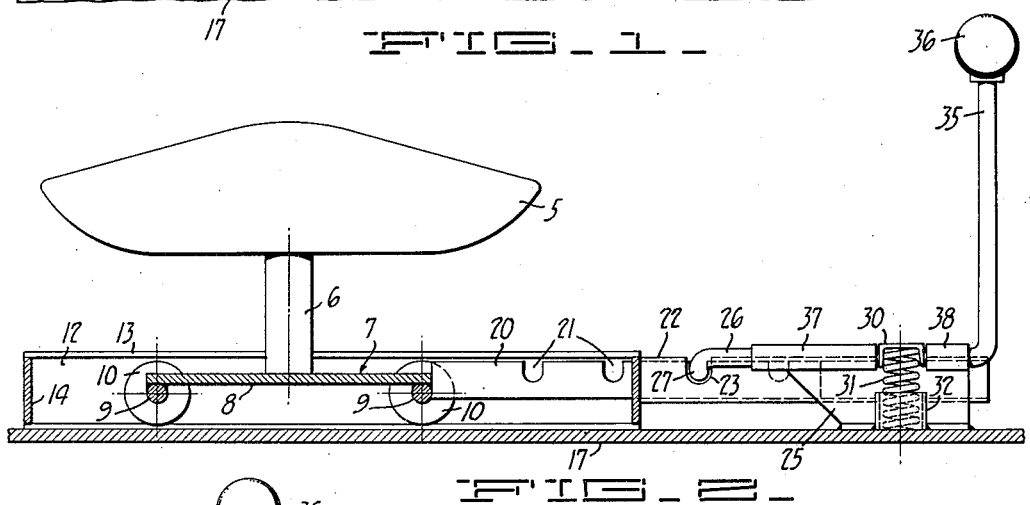
FIG_2_
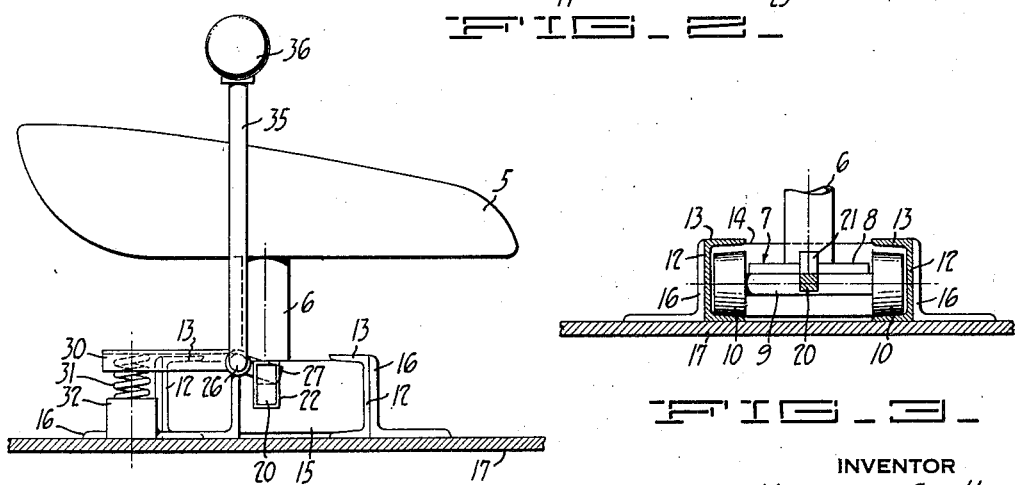
FIG_4_
FIG_3_
INVENTOR
Herman Gsell
BY
ATTORNEYS Patented July 13, 1943

2,324,207

UNITED STATES PATENT OFFICE 2,324,207

ADJUSTABLE SEAT FOR VEHICLES

Herman Gsell, San Francisco, Calif.

Application July 21, 1941, Serial No. 403,247

1 Claim. (Cl. 155—14)

The present invention relates to adjustable mountings for vehicle seats whereby the same may be easily moved to any of a series of desired positions, and, more particularly, to adjustable mountings especially adapted for use in connection with operator seats in vehicles in which it is desirable from time to time to move the operator's seat in order to afford him a clear view forward.

The principal object of the invention is to provide an adjustable seat mounting, by means of which changes in the position of the seat may be easily effected without requiring the occupant of the seat to dismount therefrom.

A further object of the invention is to provide an adjustable seat mounting, by means of which adjustment of the seat may be effected without requiring the operator to remove his feet from the vehicle controls.

A further object of the invention is to provide an adjustable seat mounting, capable of adjustment by the use of a single device such as a lever, by means of which a holding means for the seat can be manipulated, which lever will also afford a purchase by means of which the adjustment of the seat itself can be effected.

The manner in which the foregoing, together with additional objects and advantages of the invention are accomplished, can be best understood by reference to the following specification describing a preferred embodiment thereof, reference being had to the accompanying drawing, in which:

Figure 1 is a plan view of the seat mounting, the seat being removed to show underlying structure;

Figure 2 is a sectional view on the line 2—2 of Figure 1;

Figure 3 is a sectional view on the line 3—3 of Figure 1; and

Figure 4 is a view in side elevation of the novel seat mounting.

The features of the adjustable seat mounting of the present invention has been found particularly useful in connection with vehicles of the class known as "utility trucks," and while the invention is not limited in its utility to this class of vehicles, its advantages will be best understood when its use in connection with such vehicles is understood. For this reason the present embodiment is disclosed in the preferred form adapted for use in a vehicle commercially known as the Clark "Utilitruc," which is a power operated vehicle provided with load engaging fingers capable of being lowered to floor level to engage under a load and thereafter lifted and tilted on a standard disposed directly in front of the operator's seat so that the load may be conveniently carried. Such vehicles are in general use in stevedoring and warehousing throughout the country.

In view of the fact that in such vehicles the standard upon which the load lifting mechanism is carried is disposed directly in front of the operator's seat, it is desirable that the seat be transversely adjustable in order to permit the operator to obtain a view forwardly at one side or the other of the load, at his election. It is furthermore desirable to make possible such adjustment of the seat without requiring the operator to dismount therefrom, and also to avoid interference with the operator's control of the vehicle during such adjustment of the position of the seat.

For the purpose of providing an adjustable seat mounting fulfilling the foregoing requirements, the present invention contemplates the provision of a seat 5 supported as by post 6 on a dolly 7, consisting of a body portion 8 supported on transverse axles 9 on which rollers 10 are rotatably mounted.

The dolly 7 is mounted in guides consisting of channels 12 extending transversely of the vehicle, which are provided with upper flanges 13 preventing vertical displacement of the dolly 7, and closed at their ends by members 14 and 15 fixed to the channels 12, which prevent the dolly 7 from rolling past the ends of the channels. Angle irons 16, welded or otherwise secured to the channels 12 and to the frame 17 of the vehicle, secure the assembly in operating position.

The dolly 7, together with the seat 5 carried thereby, may be releasably locked in any of a series of selected positions along the line of its movement, by releasable means comprising a lock bar 20 fixed to the dolly 7 adjacent one end thereof, and provided with a series of notches 21. The free end of bar 20 extends into a sleeve 22 fixed to the end plate 15, and provided with a notch 23 into alignment with which the notches 21 of the bar 20 may be moved as the dolly 7 and seat 5 are moved.

Rockably mounted in a bracket 25 secured to the vehicle frame 17, is a shaft 26, having an angular end 27 constituting a locking finger adapted to enter the notch 23 in sleeve 22 and engage any of the notches 21 of bar 20 to lock the dolly 7 and the seat 5 in any selected position. Integral with the shaft 26 is a laterally extending arm 30 channeled to bear against and retain against displacement a spring 31 compressed between the arm 30 and the vehicle frame 17, a cup 32 being preferably provided secured to the frame 17 to prevent displacement of the spring 31.

A single device, illustrated as a handle 35, provided with a grip 36, is provided for the dual purpose of serving as an adjusting means affording a purchase engageable by an operator occupying seat 5 whereby he may shift the seat 5 from one to another selected position by the use of one hand alone, without removing his feet from the controls of the vehicle, and also for the purpose of controlling the means for releasably holding the seat in any selected position. For this purpose the handle 35 is integral with the shaft 26 which serves as a means controlled by the handle 35 to effect release of the locking finger 27. Endwise movement of the shaft is prevented by disposing the arm 30 between separated sleeve portions 37 and 38 of the bracket 25. This arrangement is such that movement of the handle 35 to rock the shaft 26 will result in raising the locking finger 27 out of the notch 21 and notch 23 to permit movement of the seat 5. A push or pull, by the occupant of seat 5, on handle 35 in a direction at right angles to that effecting the unlocking will produce a resultant force upon the seat 5, moving it in the desired direction, and upon release of the handle 35, spring 31 will relock the seat in the new position.

It will be apparent from the foregoing description of a specific embodiment of the invention, that a simple construction for attaining the objects set forth above has been provided. The specific embodiment illustrated, however, is susceptible of many modifications which will occur readily to those skilled in the art to which it relates, and of adaptation to other vehicles. The invention, therefore, is not to be regarded as restricted to the specific form shown, except in so far as is necessitated by the prior art, and by the spirit of the appended claim.

I claim:

A seat mounting for a vehicle having an adjustable seat, comprising transversely spaced channel guides mounted on the vehicle frame and constraining said seat to movement along a predetermined line, a seat-supporting dolly having rollers disposed in said channel guides, a notched member fixed to said dolly and extending in the direction of movement thereof, a movable locking finger mounted on means on the vehicle frame and engageable with the notches in said member to hold said dolly in any of a series of positions along said line of movement to which it may be adjusted, a handle pivotally mounted on means on the vehicle frame at one side of said seat in the line of movement of the seat and engageable by an occupant of said seat as a purchase for rolling said seat and dolly from one position to another, a shaft connecting said handle with said finger for moving said finger out of engagement with said notches upon movement of said handle transversely with respect to said predetermined line of movement of said seat, and spring means for reengaging said finger in one of said notches upon release of said handle.

HERMAN GSELL.